United States Patent
Hotta

(10) Patent No.: US 7,024,042 B2
(45) Date of Patent: Apr. 4, 2006

(54) WORD RECOGNITION DEVICE, WORD RECOGNITION METHOD, AND STORAGE MEDIUM

(75) Inventor: Yoshinobu Hotta, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 878 days.

(21) Appl. No.: 09/949,872

(22) Filed: Sep. 12, 2001

(65) Prior Publication Data

US 2002/0097915 A1 Jul. 25, 2002

(30) Foreign Application Priority Data

Oct. 4, 2000 (JP) ........................................ 2000-304758

(51) Int. Cl.
*G06K 9/72* (2006.01)

(52) U.S. Cl. ...................... 382/229; 382/170; 382/171; 382/179; 382/185; 382/187; 382/190; 382/209; 704/9; 707/2; 707/6; 715/533

(58) Field of Classification Search ................ 382/170, 382/171, 179, 180, 181, 185, 187, 190, 197, 382/198, 200, 202, 209, 227, 229, 242, 243, 382/253, 286, 305; 704/1, 9, 10; 707/1, 2, 707/3, 6; 715/533
See application file for complete search history.

(56) References Cited

U.S. PATENT DOCUMENTS

| | | | | | |
|---|---|---|---|---|---|
| 4,959,870 A | * | 9/1990 | Tachikawa | ................... | 382/253 |
| 4,991,135 A | * | 2/1991 | Yoshimura et al. | ............ | 707/3 |
| 5,150,424 A | * | 9/1992 | Aguro et al. | ................ | 382/189 |
| 5,481,625 A | * | 1/1996 | Suzuki | ........................ | 382/187 |
| 5,526,440 A | * | 6/1996 | Sakano et al. | .............. | 382/202 |
| 5,590,317 A | * | 12/1996 | Iguchi et al. | ................... | 707/2 |
| 5,982,929 A | * | 11/1999 | Ilan et al. | .................... | 382/200 |
| 6,178,396 B1 | * | 1/2001 | Ushioda | ........................ | 704/1 |
| 6,208,755 B1 | * | 3/2001 | Mori et al. | ................... | 382/187 |
| 6,275,610 B1 | * | 8/2001 | Hall et al. | ................... | 382/180 |
| 6,289,124 B1 | * | 9/2001 | Okamoto | ..................... | 382/187 |
| 6,535,877 B1 | * | 3/2003 | Hirayama | ....................... | 707/6 |
| 6,643,401 B1 | * | 11/2003 | Kashioka et al. | ........... | 382/197 |
| 6,751,605 B1 | * | 6/2004 | Gunji et al. | ................... | 707/1 |

FOREIGN PATENT DOCUMENTS

| | | |
|---|---|---|
| JP | A-2000-306045 | 11/2000 |
| JP | A-2001-147989 | 5/2001 |

* cited by examiner

*Primary Examiner*—Bhavesh M. Mehta
*Assistant Examiner*—Gregory Desire
(74) *Attorney, Agent, or Firm*—Staas & Halsey LLP

(57) ABSTRACT

The capacity of a character feature dictionary is reduced, and stored as a feature dictionary. The capacity is reduced by clustering feature vectors in units of columns or rows for character features, by making m column vectors represent the column or row features, and by assigning 1 to m identification numbers. The capacity of the dictionary can be further reduced by representing a column or row feature with an addition sum of other column or row features, or differential features after clustering is performed, or by performing dimension compression for character features. Word recognition is performed by synthesizing a word feature for a comparison based on a word list to be recognized, and by making a comparison between a feature extracted from an input word and the synthesized feature. Or, a comparison between input word and input word features whose numbers of dimensions are different may be made with nonlinear elastic matching.

13 Claims, 17 Drawing Sheets

NORMALIZED IMAGE     FEATURE VECTOR

WIDTH 1

WIDTH 3

→ $(423,123,109,198,321,239,351)^t$

MESH NUMBER REPRESENTATION OF COLUMN VECTOR

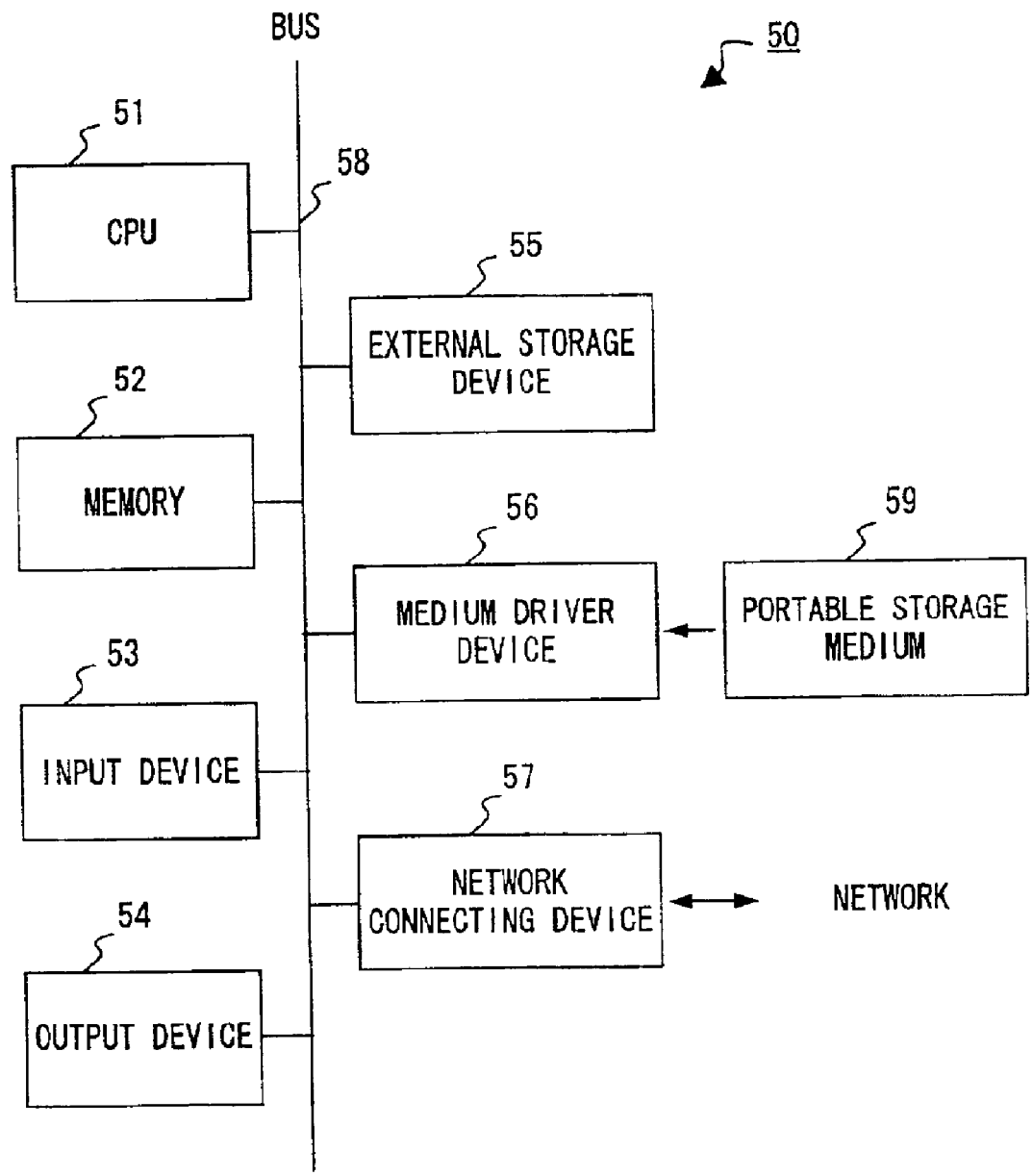
F I G. 16

WORD RECOGNITION DEVICE, WORD RECOGNITION METHOD, AND STORAGE MEDIUM

BACKGROUND OF THE INVENTION

1. Field of the Invention

The present invention relates to word recognition in a character recognition device.

2. Description of the Related Art

In recent years, the demand for character recognition device OCR or software OCR has been increasing.

Word recognition is a method with which individual characters are not recognized by separating a handwritten word such as 東京 into individual characters when a handwritten word is recognized, but the word itself is collectively recognized. With this method, recognition with high accuracy can be implemented even if characters are in contact. This is one of effective methods for recognizing a handwritten character string in a free pitch region. A word recognition device according to the present invention is applicable not only to a handwritten character recognition device, but also to a character recognition device in a broad sense, such as a printed character recognition device, a character recognition device of a portable information terminal, etc.

As a method recognizing a handwritten word by generating a word feature dictionary for a comparison with the synthesis of the features of characters structuring a word, and by making a comparison with the feature of an input word, for example, the methods recited by Japanese Patent Application Nos. 11-113733, 11-330288, etc. have been proposed.

The invention disclosed by the above described application No. 11-113733 is intended to collectively recognize an input word image without recognizing the individual characters structuring the input word image, after a word feature dictionary is generated based on the features of individual characters. With this method, word recognition can be performed with high accuracy by using an individual character image dictionary of a small capacity.

Additionally, the invention disclosed by the above described application No. 11-330288 is intended to be able to cope with a change in a character shape of an input word image by generating a word dictionary with the synthesis of a plurality of word features for one word.

If a character feature dictionary for synthesizing a word feature is arranged, features are extracted from a character image the position or width of which is changed for each character, and all the features are held, according to the conventional method disclosed by Japanese Patent Application No.11-330288.

For example, as shown in FIG. 1, features of horizontal widths 1/6, 2/6, . . . , 6/6 (hereinafter referred to as p/q features) are extracted, and all of the extracted features are held. In this case, the number of features per character is 21 (a calculation expression: q(q+1)/2).

As a feature of an individual character, for example, a weighted direction code histogram feature (see "Improvement of handwritten Japanese Character Recognition Using Weighted Direction Code Histogram, Pattern Recognition", Tsuruoka et al., the IEICE Transactions D Vol. J70-D No. 7, pp.1390–1397, July 1987) is used. The weighted direction code histogram feature is a feature such that the direction code histogram of each of small regions, into which a character image are partitioned, is regarded as a feature vector. By way of example, as shown in FIG. 2, feature amounts are extracted in 8 directions obtained by dividing 360° by 8 within 7 (length)×7 (width) meshes. Each of the meshes possesses 8-directional dimension feature amounts. For example, a 3/7 feature of a character 東 is shown in FIG. 2.

If a word feature is synthesized, it is synthesized so that a sum of p/q fractions of individual character features results in 1. By way of example, for a word composed of two characters, a word feature is synthesized by adding "a 3/7 feature+a 4/7 feature", "a 2/7 feature+a 5/7 feature", etc. For instance, if the features of a word 東京 is synthesized, the 3/7 feature of 東 and the 4/7 feature of 京 are added, so that 東京 is synthesized, shown in FIG. 3.

However, since character features the positions and widths of which are changed must be held for all of character categories of approximately 4,000, a capacity of several hundred M bytes are required, which is a serious problem from a practical viewpoint.

SUMMARY OF THE INVENTION

The present invention was developed in view of the above described circumstances, and aims at providing a word recognition device and method that can significantly reduce the capacity of a character feature dictionary, and can speed up a recognition process.

To overcome the above described problem, according to the present invention, the capacity of a feature dictionary for synthesizing a word feature is reduced, and made to reach a practical level. Additionally, a method making a comparison between a synthesized word feature and an input word feature is improved, and a change in a character shape is absorbed by a compared portion, so that the capacity of the dictionary is further reduced.

A word recognition device according to the present invention comprises a capacity reducing unit reducing the capacity of a character feature dictionary used to synthesize a word feature, a synthesizing unit synthesizing a word feature for a comparison based on a word list to be recognized from column or row features within the feature dictionary the capacity of which is reduced by the capacity reducing unit, a feature extracting unit extracting a feature of an input word; and a comparing unit making a comparison between the feature of the input word, which is extracted by the feature extracting unit, and the synthesized word feature.

The capacity reducing unit reduces the capacity of the feature dictionary, for example, by collecting (clustering) similar features among the column or the row features of all characters (for example, 4,000 character types) at the time of learning. When recognition is performed, a feature amount of each of characters structuring a word to be recognized is synthesized every time by using the column or row features clustered and registered.

BRIEF DESCRIPTION OF THE DRAWINGS

FIG. 16 shows the hardware configuration of an information processing device implementing a word recognition device.

DESCRIPTION OF THE PREFERRED EMBODIMENTS

Figure 4:
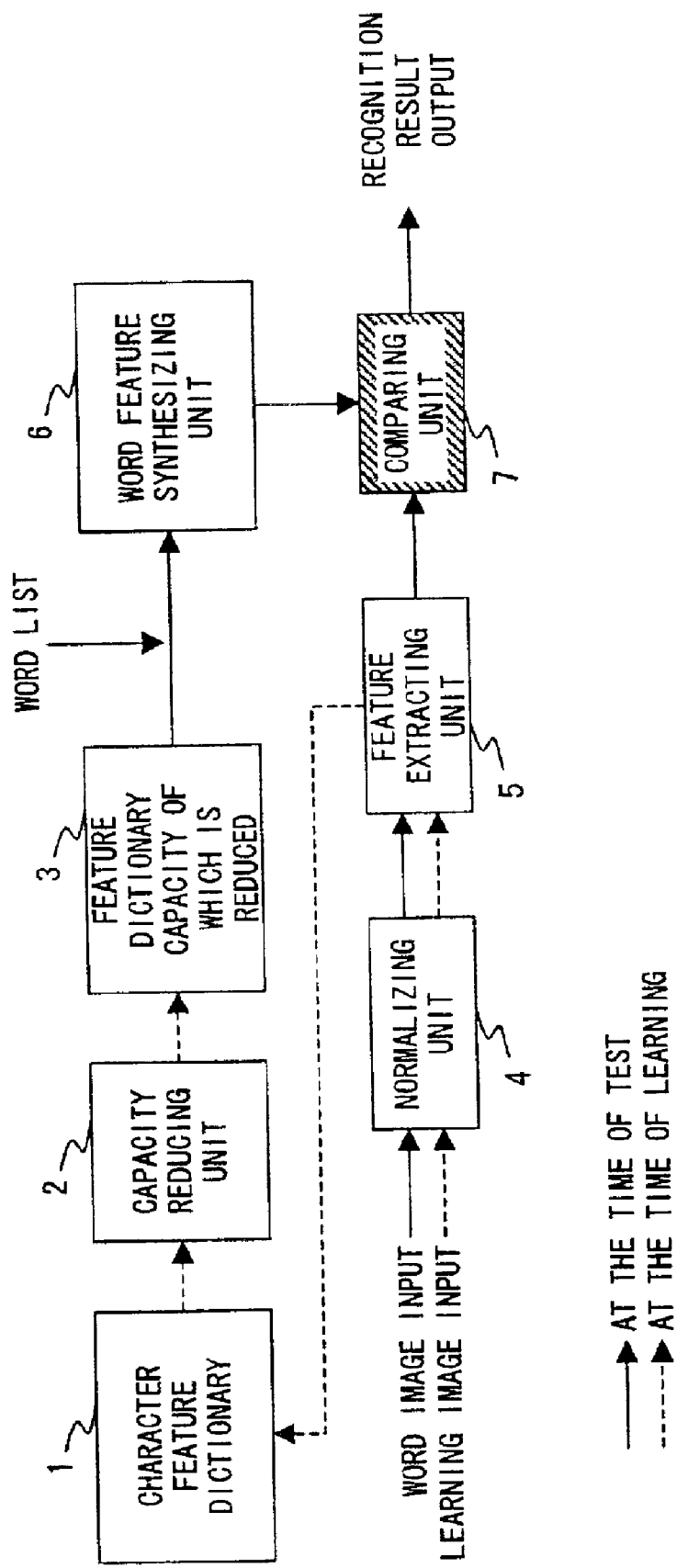
FIG. 4 shows the principle of the present invention.

FIG. 4 shows the principle of the present invention. In this figure, 1 is a character feature dictionary, in which feature vectors extracted from an input character image are stored. 2 is a capacity reducing unit for reducing the capacity of the character feature dictionary 1. 3 is a feature dictionary, in which column (for horizontal writing) or row (for vertical writing) features the data amount of which is reduced by the capacity reducing unit 2 are stored at the time of learning.

Reduction in the data amount of character features by the capacity reducing unit 2 is made as follows.

(1) Feature vectors are clustered in units of columns or rows for all character features stored in the character feature dictionary 1, and similar features are collected and represented by m column or row vectors. 1 to m identification numbers are respectively assigned to the representative vectors (assigning 1 to m identification numbers is hereinafter referred to as coding).

Coding may be executed by performing clustering not for only one column or row, but in units of a plurality of columns. Furthermore, if coding is performed for column or row characters not in units of column or row features but in units of meshes, coding based on more accurate feature approximation is enabled.

(2) It is examined whether or not there is a combination with which a certain column feature can be represented by an addition sum of other column features, or a combination with which a certain row feature can be represented by an addition sum of other row features. If there is a corresponding combination, the identification number of the column or the row feature and a synthesis coefficient are stored in the dictionary.

Or, it is examined whether or not a combination with which a certain column feature can be represented by a sum of other column features and a differential feature, or a combination with which a certain row feature can be represented by a sum of other row features and a differential feature. If there is a corresponding combination, the identification number of the column or the row feature and a synthesis coefficient are stored in the dictionary.

(3) Dimensions are compressed beforehand by converting character features, and coding is performed by clustering the converted features.

By holding index information for the feature vectors within the feature dictionary 3, a high-speed access to the feature dictionary can be made. Furthermore, by arranging column or row features in a descending order of use frequencies, also an access to the index information can be made at high speed.

Word recognition is performed as follows by using the feature dictionary 3 the capacity of which is reduced as described above.

A normalizing unit 4 normalizes an input word, and a feature extracting unit 5 extracts the feature of the input word. In the meantime, a word feature synthesizing unit 6 synthesizes a word feature for a comparison from the column or the row features stored in the feature dictionary 3 based on a predetermined word list to be recognized.

Then, a comparing unit 7 makes a comparison between the features extracted from the input word and the synthesized word feature, so that word recognition is performed.

The comparing unit 7 makes a comparison between word and input word features the numbers of dimensions are different, by using non-linear elastic matching. As a result, a change in a character shape can be absorbed not by a feature vector within the dictionary, but by a compared portion, thereby further reducing the capacity of the dictionary.

Namely, with the conventional word recognition, the matching method itself is poor in coping with a change in the shape of an input character. Accordingly, a plurality of features (such as the above described 3/6 feature, 4/6 feature, etc.) must be held for one character category in a feature dictionary. In the meantime, the above described nonlinear elastic matching itself has the effect of absorbing a change in a character shape, so that it can be expected that the number of features held in a feature dictionary is decreased, and the capacity of the dictionary can be reduced.

Hereinafter, preferred embodiments according to the present invention are explained.

The present invention can be implemented by a normal computer system that comprises a processing device, a main storage device, an external storage device, an input device for reading an image, such as a scanner, keyboard, etc., an output device such as a printer, display, etc., a communications interface, and the like. A program, data, etc. for executing the processes according to the present invention are stored in the external storage device, etc., and the program, data, etc. are read into the main storage device, so that the processes according to the present invention are executed.

The present invention is explained by targeting a horizontally written word, although the present invention is effective regardless of vertical/horizontal writing. If the present invention is applied to vertical writing, change a column vector explained below to a row vector.

Additionally, the present invention targets a feature that can be divided in units of columns, although character features are classified into several types. Furthermore, a feature that can be divided in units of meshes is handled as a column feature by vertically arranging features within meshes.

Specifically, features in units of columns include an n-dimensional peripheral feature, a projected feature, etc. Mesh type features include a weighted direction code histogram feature, a directional element feature, a mesh feature, etc. Hereinafter, explanation is provided by taking as an example the above described weighted direction code histogram feature. Notice that, however, the divided number of a mesh, the number of directions, etc., which are used in the following explanation, are not limited to the numeric values in this specification.

(1) Preferred Embodiment 1

Figure 1:
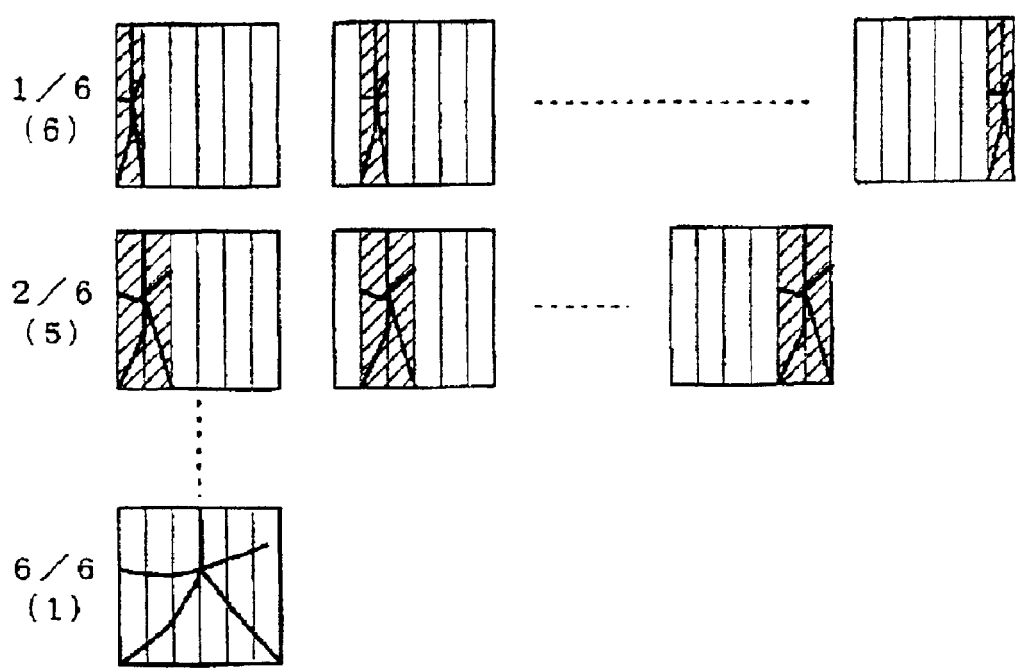
FIG. 1 exemplifies a reduced character image (a character 大 for character features.
Figure 2:
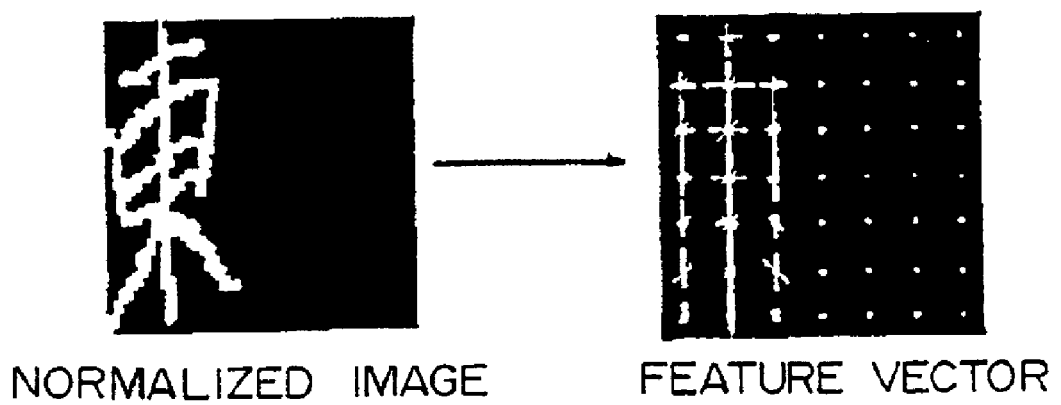
FIG. 2 exemplifies a weighted direction code histogram feature.
Figure 3:
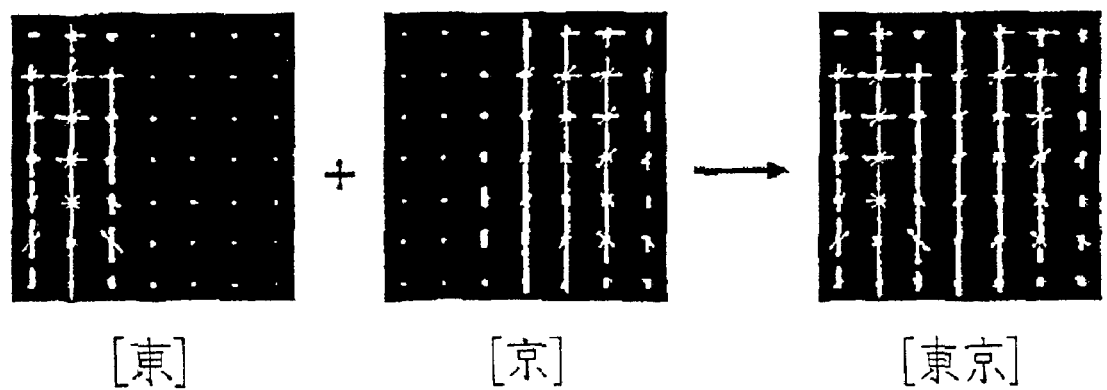
FIG. 3 exemplifies the synthesis of a word feature.

The weighted direction code histogram feature has features of 8 directions, for example, within 7 (length)×7 (width) meshes partitioned for a normalized character image at the final stage of a feature extraction process as described above. Namely, it has features of 7×7×8 dimensions. Here, the 8 directions indicate the directions obtained by dividing 360° by 8 in units of 45° as shown in FIGS. 2 and 3.

In this preferred embodiment, feature vectors are clustered in units of columns so as to reduce the capacity of a character feature dictionary.

Figure 5:
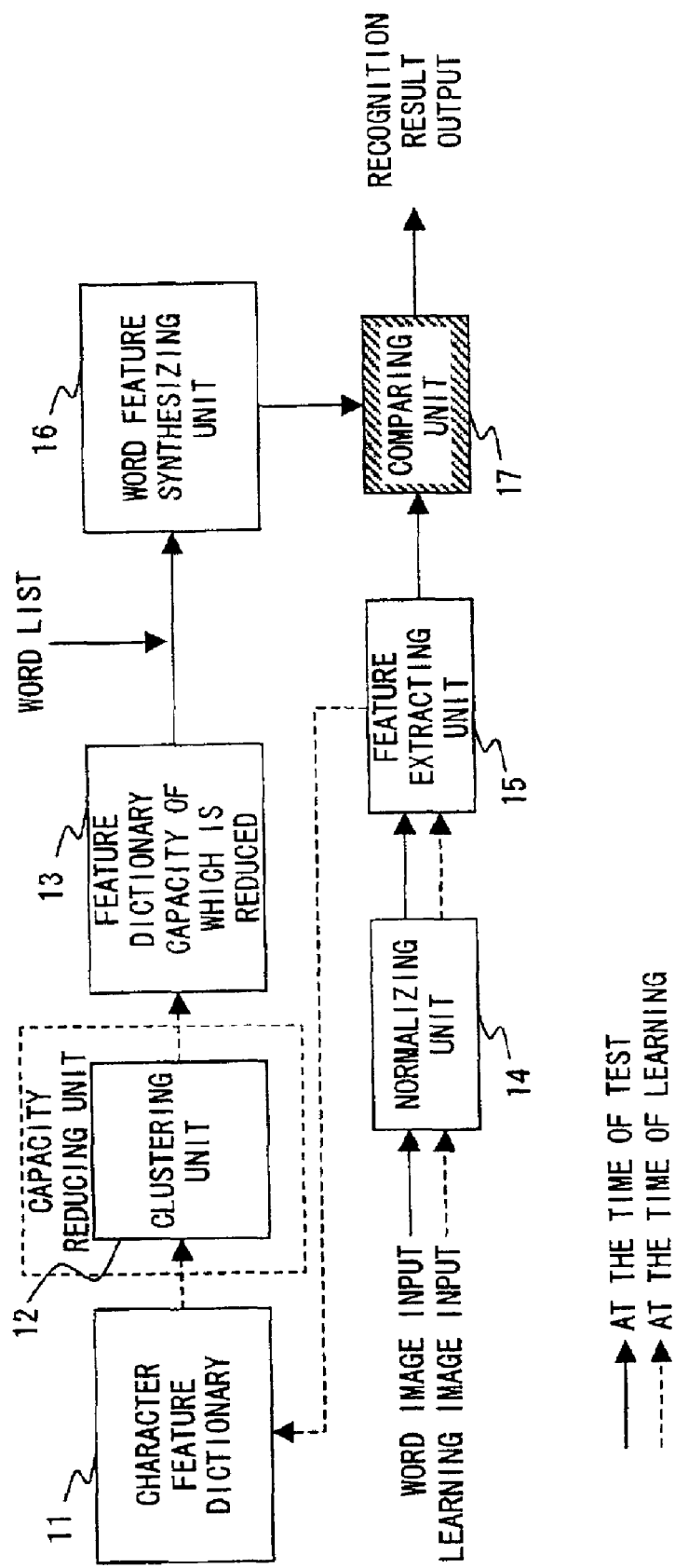
FIG. 5 shows the configuration of capabilities of a first preferred embodiment according to the present invention.

FIG. 5 shows the configuration of capabilities of a first preferred embodiment.

In this figure, feature vectors extracted from an input character image are stored in a character feature dictionary 11 at the time of learning.

Figure 6A:
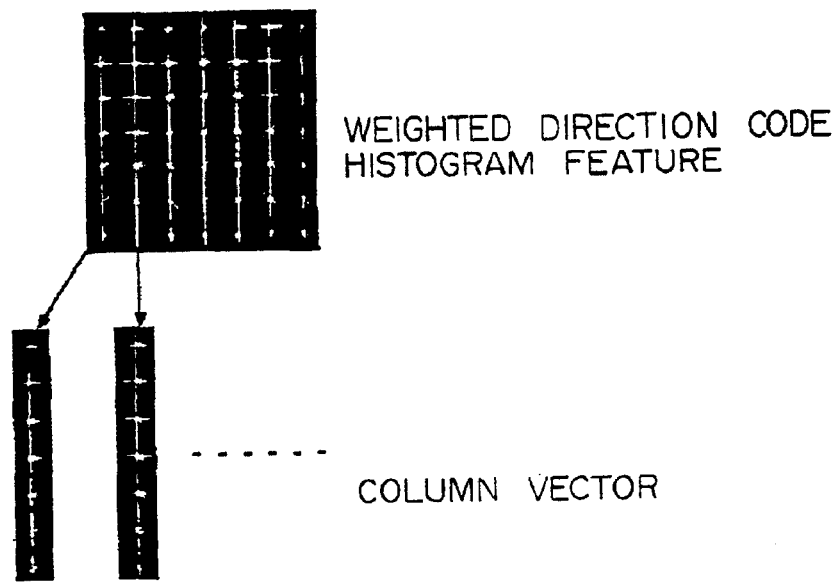
FIGS. 6A and 6B explain the clustering of feature vectors in units of columns (No. 1)

A clustering unit 12 relating to this preferred embodiment clusters feature vectors in units of columns of a weighted direction code histogram feature for the character features stored in the character feature dictionary 11 so as to reduce the capacity of the character feature dictionary 11 at the time of learning, as shown in FIG. 6A.

Namely, feature vectors (7×8=56 dimensions) within meshes of 7 (length)×1 (width) are regarded as one unit, and similar features are collected and represented by m column vectors. Then, 1 to m identification numbers are respectively assigned to the representative vectors.

Figure 6B:
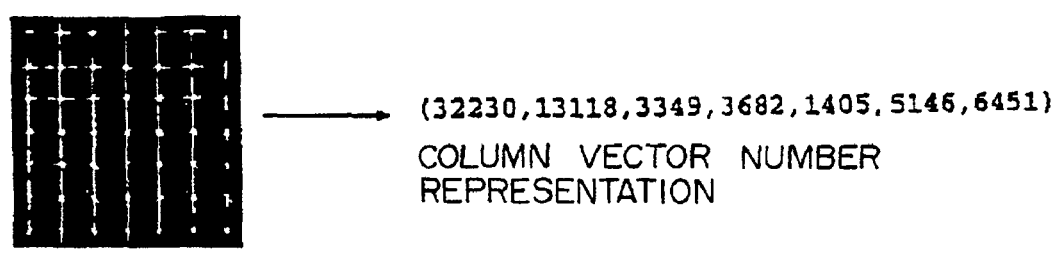

FIG. 6B exemplifies a column vector number representation of the weighted direction code histogram feature. As shown in this figure, m identification numbers coded by performing clustering in units of columns are respectively assigned to character feature vectors. In this example, identification numbers (32230, 13118, . . . , 6451) are respectively assigned to the columns.

The conventional method requires column features by [(the number of character categories)×(the number of features per character)×(the number of column features)] (for example, 4000×21×7 column features if it is assumed that the number of character categories is 4000, the number of features per character is 21, and the number of column features is 7). However, according to the present invention, it becomes possible to dispense with the above described large number of column features, which is required by the conventional method. Only m column features that are far smaller than the above described number are required. Details will be described later.

As a clustering technique, normal clustering techniques such as hierarchical clustering, k-means, LVQ (Learning Vector Quantization), etc. are available.

m column vectors which are clustered and identification numbers are assigned to as described above are stored in a feature dictionary 13.

The above described process for collecting similar features, which are represented by m column vectors, and for respectively assigning 1 to m identification numbers to the representative vectors is further explained in detail with reference to FIG. 7.

Figure 7:
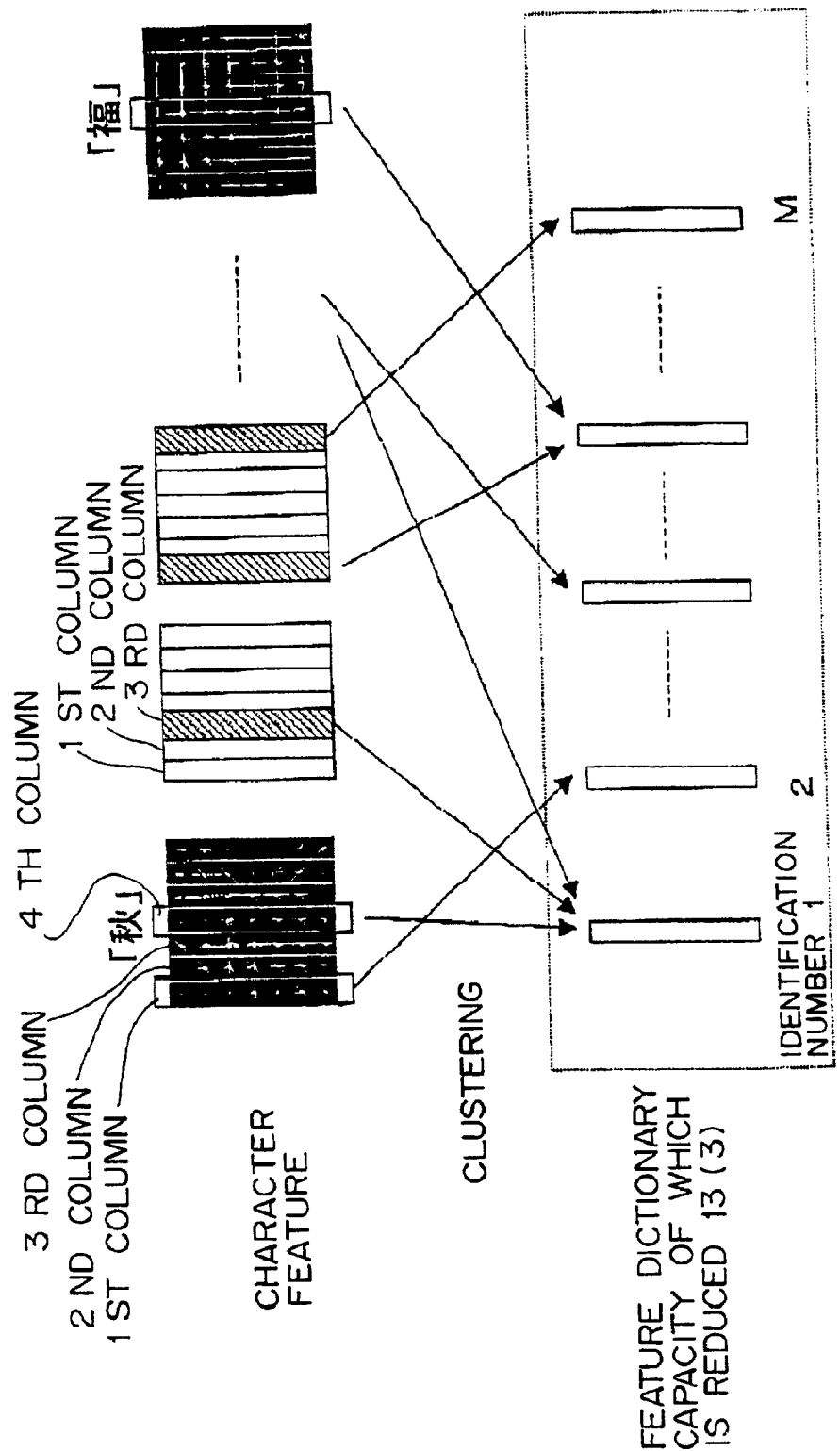
FIG. 7 explains the clustering of feature vectors in units of columns (No. 2)

The top of FIG. 7 shows the state where features of, for example, 4000 characters such as 秋 to 福 are respectively divided into the above described feature vectors (column vectors) in units of columns from 1 to 7.

The bottom of FIG. 7 shows the state where similar vectors are collected from among the column vectors (column vectors of 4000×7) of all the characters, identification numbers are assigned to the similar vectors, and the vectors are stored as representative vectors in the feature dictionary 13 the capacity of which is reduced. In this example, for instance, the 4th column vector among 7 column vectors of the character 秋 is regarded as being similar to the 3rd column vector of any of the characters on the right side of 秋, and also similar to any of column vectors of the still other characters. Similar vectors are collected and stored as a representative vector to which an identification number 1 is assigned in the feature dictionary 13 the capacity of which is reduced.

A criterion for judging whether or not similarity exists is determined, for example, based on the experiences or guesswork of a designer.

As described above, similar column vectors are collected into one, so that the value of m results in a fraction to a tenth-odd of the total of the numbers of column vectors of all characters. For instance, in the above provided example, the number of features per character (features of a character the position or the width of which is changed: for details, see the above described patent application No. 11-330288) results in 28 (=7×(7+1)÷2) according to a calculation expression q(q+1)÷2 of the above described conventional technique. Therefore, column features the number of which is 784000=the number of character types×the number of columns×28=4000×7×28 must be conventionally held in order to cope with a change in a character shape. In this preferred embodiment, the value of m becomes far smaller than 784000, and is expected to become, for example, on the order of several ten thousands to hundred thousand-odd.

Figure 8:
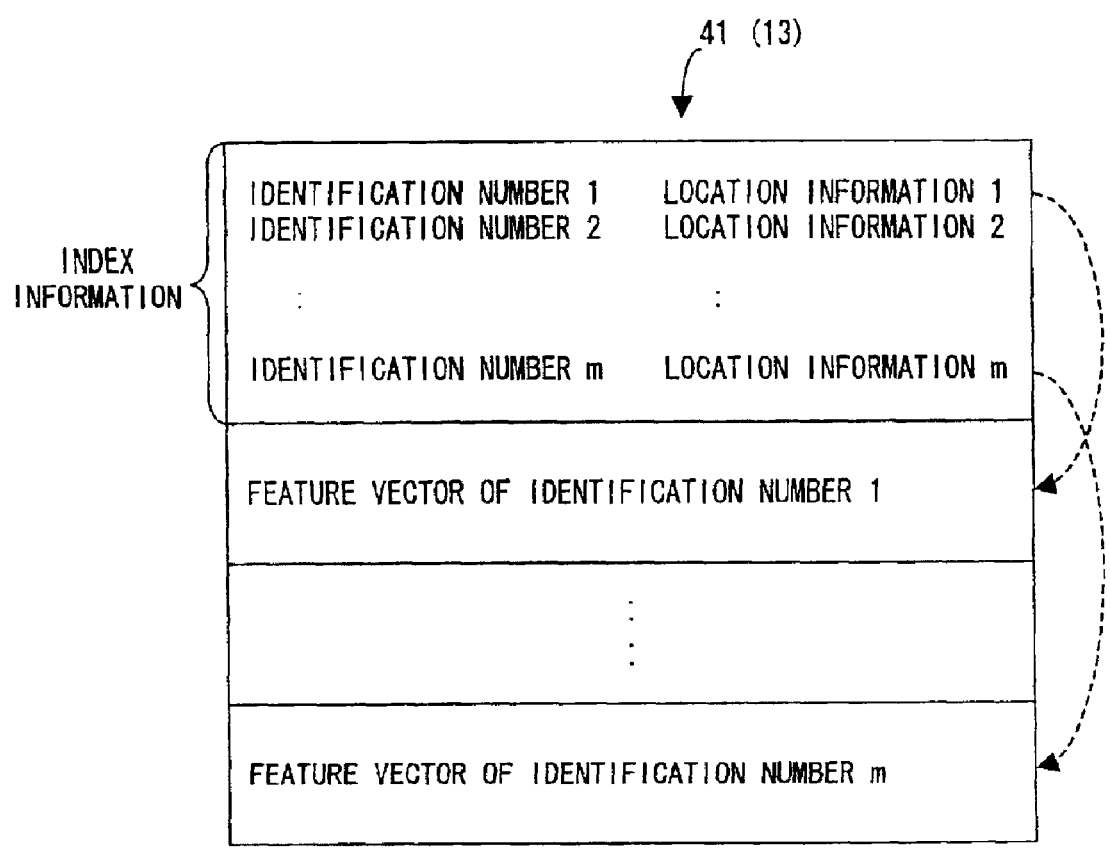
FIG. 8 exemplifies the structure of a feature dictionary according to a first preferred embodiment.

FIG. 8 exemplifies the structure 41 of the above described feature dictionary 13. The feature dictionary 13 the capacity of which is reduced has identification numbers and location information within the dictionary as index information as shown in FIG. 8. The location information indicates the storage locations of m feature vectors that respectively correspond to the identification numbers.

When the identification numbers are arranged, an appearance frequency of a character feature, which is required when a word feature is generated, is examined beforehand for a category (such as an address, a name) to be recognized. The identification numbers are arranged in a descending order of appearance frequencies, so that an access to the index information can be made faster.

With the feature dictionary 13 the capacity of which is reduced as described above, word recognition is performed as follows.

First of all, a normalizing unit 14 normalizes an input word. A feature extracting unit 15 extracts a feature from the input word. In the meantime, a word feature synthesizing unit 16 synthesizes a word feature for a comparison from the column features stored in the feature dictionary 13 based on a predetermined word list to be recognized (such as a prefecture name list, etc. when word recognition is performed for prefecture names).

Then, a comparing unit 17 makes a comparison between the feature extracted from the input word and the synthesized word feature, so that word recognition is performed. The comparison between the input word feature and the synthesized word feature is made by using the Euclidean distance, etc.

As described above, in this preferred embodiment, the feature vectors within the character feature dictionary 11 are clustered in units of columns, similar features are collected, m column vectors are made to represent the collected features, and the features are coded. As a result, the capacity of the feature dictionary 13 can be significantly reduced, and can reach a practical level.

Furthermore, index information is held for feature vectors within the feature dictionary, whereby an access to the dictionary can be made at high speed.

The above described process at the time of word recognition (at the time of a test) is further explained in detail below by citing a specific example.

Here, explanation is provided by taking an example of recognizing an address. An address is normally written in an order of 都道府県, 区市郡, 町村, 番地, etc. Any of key characters within a prefecture is detected at first in an input image. A character string preceding the detected key character is extracted. Here, if 県 (Prefecture)" is taken as an example, 県 includes 青森県, 秋田県, 県etc. When "県" is detected as a key character, its preceding character string "青森", "秋田", "神奈川", or the like is extracted. After the normalizing unit 14 normalizes the extracted character string, the feature extracting unit 15 extracts a feature amount, and passes the extracted amount to the comparing unit 17.

In a storage area not shown, a word list is stored. To the word list, "青森", "秋田", "神奈川", etc. are registered for "県". As a matter of course, names are registered not only for "県", but also for "町村", "区市郡", "町村", etc.

If "県", is detected as in the above described example, the word feature synthesizing unit 16 sequentially selects the words relating to "県", such as "青森", "秋田", "神奈川", or the like, based on the word list, and synthesizes the feature amount of a selected word each time a word is selected by using the column features (column vectors) stored in the feature dictionary 13 the capacity of which is reduced. The synthesized feature amount is passed to the comparing unit 13, which makes a comparison between the synthesized feature amount and the feature amount extracted by the feature extracting unit 15.

Details of the process performed by the word feature synthesizing unit 16 are explained with reference to FIG. 9.

Figure 9:
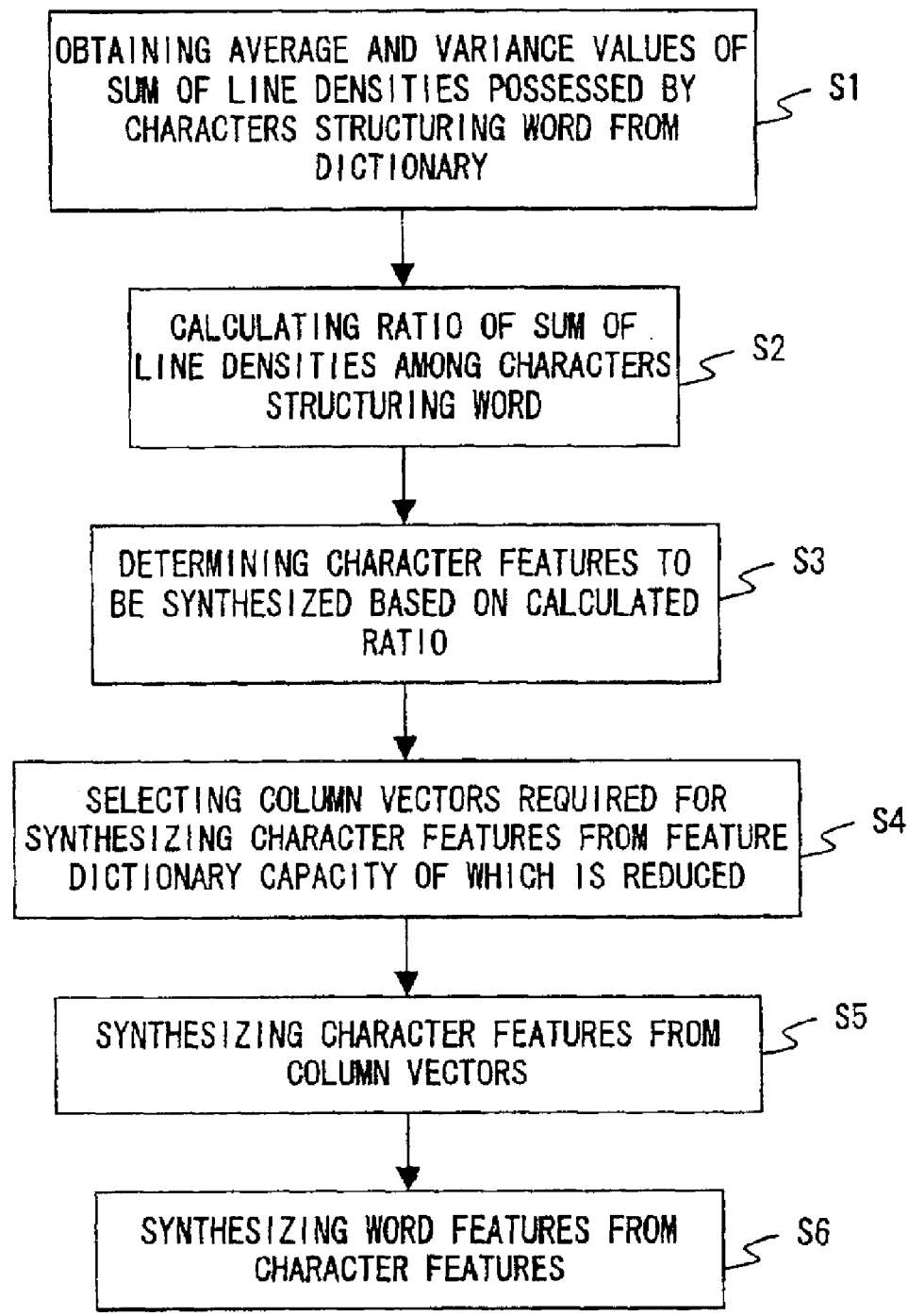
FIG. 9 is a flowchart for explaining a word feature synthesis process.

FIG. 9 is a flowchart for exemplifying the process performed by a word feature synthesizing unit 16.

First of all, for example, an average value and a variance value (the square of a standard deviation) of the sum of line densities are obtained as feature values of each of characters structuring a word selected from the above described word list (dictionary) (step S1). The feature values for each of the characters is calculated and stored beforehand.

Next, a ratio of the feature values of the characters is calculated (step S2).

Then, character features to be synthesized are determined based on the ratio calculated in step S2 (step S3). Namely, the synthesis ratio of the word (the word is generated at what ratio of respective characters to be synthesized) is determined.

The process up to this point is the process that was proposed by the previous application (Japanese Patent Publication No. 11-330288) filed by the present applicant. According to the present invention, the operations in the following steps S4 and S5 are different from the previous application.

Namely, in this preferred embodiment, the features of characters structuring the word are synthesized by using the column features (column vectors) stored in the feature dictionary 13 the capacity of which is reduced. Firstly, column vectors required for the synthesis are selected from the feature dictionary 13 the capacity of which is reduced (step S4). Next, the character features are synthesized from the selected column vectors (step S5). Then, a word feature is synthesized from the character features synthesized as described above (step S6).

Figure 10A:
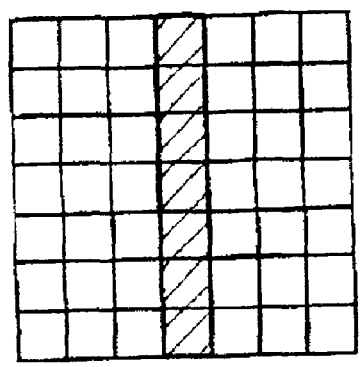
FIGS. 10A and 10B explain the clustering of the features of a plurality of columns.

In the above described preferred embodiment, when column characters are clustered, feature vectors are clustered in units of columns having a width 1 as shown in FIG. 10A. However, column features having not a width 1, but a width 2, 3, etc. may be collectively clustered.

Figure 10B:
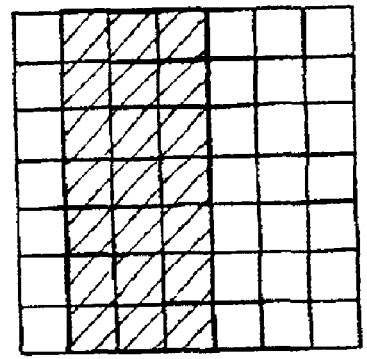

Namely, as shown in FIG. 10B, features of 7 (length)×n (width)×8 dimensions are clustered as one unit if the width is assumed to be n. Since a column feature unit is larger than in the case of a width 1, word synthesis can be made faster.

Additionally, when a word feature is synthesized from character features, the number of dimensions of the synthesized feature and the number of dimensions of an input word feature are made identical. Namely, the synthesized word feature and the input word feature are configured as features of 7 (l)×7 (w)×8 directional dimensions, and a comparison is made by using the Euclidean distance, etc. However, a comparison may be made between column features whose numbers of dimensions differ as shown in FIG. 11.

Namely, a comparison is enabled with the nonlinear elastic matching between synthesized and input word features even if their numbers of dimensions differ. As one example of the nonlinear elastic matching, DP (dynamic programming) matching is available (For the DP matching, by way of example, see "Pattern Recognition" pp. 62–67written by N. Funakubo, published by Kyoritsu Shuppan Co., Ltd.).

Figure 11:
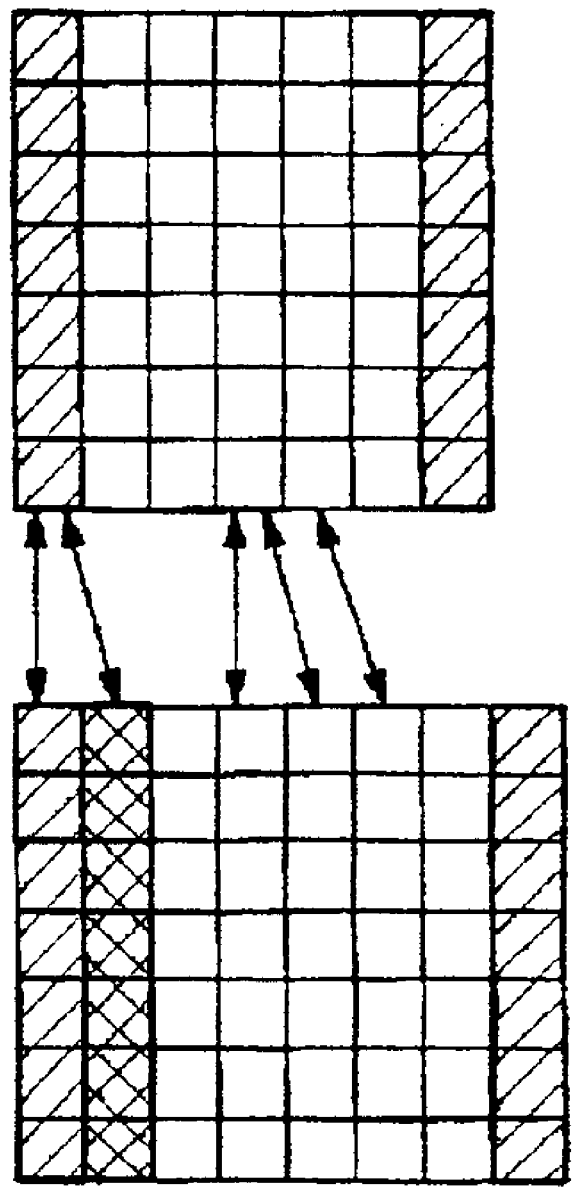
FIG. 11 explains a comparison in the case where the number of dimensions of a synthesized word feature and that of an input word feature are different.

As a result, a comparison can be made between synthesized and input word features, even if their features are respectively 7(l)×8(w)×8 and 7(l)×7(w)×8 directional dimensions, etc., as shown in FIG. 11.

By making the above described comparison, the capacity of the dictionary can be further reduced. This is because a change in a character shape can be absorbed not by a feature vector within the dictionary, but by a compared portion.

Additionally, the above provided explanation refers to the clustering using a column vector as a unit. However, a column vector is viewed more precisely in units of meshes, and a clustering process may be performed in units of meshes.

Figure 12:
FIG. 12 explains the case where clustering is performed in units of features within meshes.

Namely, as shown in FIG. 12, the clustering process is performed in units of features (8 dimensions) within a mesh, and the features within one mesh are coded. A column vector is represented by meshes of 7 (l)×1 (w). As a result, the column vector is represented by 7 identification numbers. In the example shown in FIG. 12, identification numbers (432, 123, . . . , 351) are assigned to the respective meshes (t represents a transposition).

By performing clustering in units of meshes and coding features as described above, identification numbers can be assigned based on more accurate feature approximation.

Furthermore, meshes may be coded by clustering features within the meshes as described above, so that the clustering process may be performed for the respectively coded meshes in units of columns.

That is, the features within the meshes are coded by performing the clustering process as shown in FIG. 12, and the clustering process may be performed for the respectively coded columns, to which identification numbers may be assigned.

(2) Preferred Embodiment 2

A second preferred embodiment according to the present invention, with which the capacity of a feature dictionary is reduced by using a synthesis coefficient after column features are clustered, is explained next.

Assume that the number of coded column vectors (representative vectors) is m, the "p"th column vector is $f_p$, and a synthesis coefficient is $k_i$. In this case, it is examined whether or not there is a combination of a synthesis coefficient k and a column vector, which can be represented by the following equation (1). If there is a corresponding combination, the identification number of the column vector and the synthesis coefficient are registered.

$$f_p = \sum_{i}^{n} k_i * f_i \quad (i \neq p) \tag{1}$$

As a result, it is sufficient to hold the synthesis coefficient k instead of a column vector within the feature dictionary, thereby reducing the capacity of the dictionary.

Figure 13:
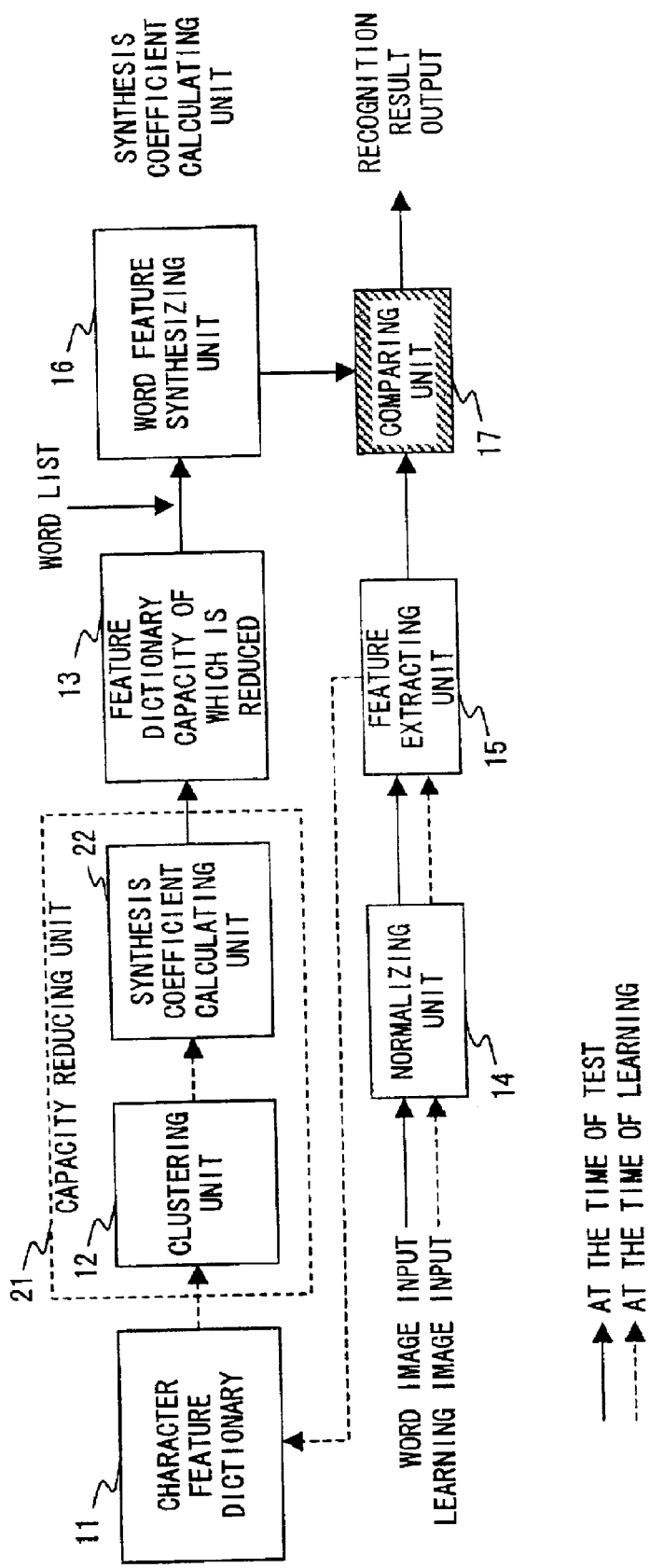
FIG. 13 shows the configuration of capabilities of a second preferred embodiment according to the present invention.

FIG. 13 shows the configuration of capabilities of the second preferred embodiment.

In FIG. 13, feature vectors extracted from an input character image are stored in a character feature dictionary 11 at the time of learning as described above. A capacity reducing unit 21 according to this preferred embodiment is configured by the above described clustering unit 12 and a synthesis coefficient calculating unit 22.

The clustering unit 12 clusters feature vectors in units of columns of weighted direction code histogram features, and respectively assigns identification numbers 1 to m to representative vectors, as described above.

The synthesis coefficient calculating unit 22 examines whether or not there is a combination of a synthesis coefficient k and a column vector, which can be represented by the above equation (1). If there is a corresponding combination, the identification number of the column vector and the synthesis coefficient are registered.

The synthesis coefficient or the column vector, which is obtained by the synthesis coefficient calculating unit 22 as described above, is stored in the feature dictionary 13.

A word recognition process in the second preferred embodiment can be executed in a similar manner as in the first preferred embodiment. Namely, a normalizing unit 14 normalizes an input word, and a feature extracting unit 15 extracts a feature from the input word. A word feature synthesizing unit 16 synthesizes a word feature for a comparison from column features stored in the feature dictionary 13.

Next, a comparing unit 17 performs word recognition by making a comparison between the feature extracted from the input word and the synthesized word feature.

The above described comparison may be made not only between synthesized and input word features whose numbers of dimensions are the same, but also between synthesized and input word features whose numbers of dimensions are different.

Additionally, the clustering process may collectively cluster not only column features having a width 1, but also column features having a width 2 or 3, or may cluster column features in units of meshes.

The above provided explanation refers to the case where a certain column vector is represented by a sum of other column vectors. However, a column vector may be represented by a sum of other vectors and differential vectors. Namely, it is examined whether or not there is a combination of synthesis coefficients k and l, a column vector, and a differential vector, which can be represented by the following equation (2), if it is assumed that the differential vector is $g_j$ and the coefficient is $l_j$. If there is a corresponding combination, the synthesis coefficients, the column vector, and the differential vector are registered. Note that the differential vector $g_j$ is a difference between arbitrary feature vectors among feature vectors.

$$f_p = \sum_{i}^{n} k_i * f_i + \sum_{j}^{n} l_j * g_j \quad (i \neq p) \tag{2}$$

In this way, a column feature can be represented by an addition sum of other column features, or a sum of an addition sum of other column features and (an addition sum of) differential features, so that a frequency at which a column feature can be represented becomes higher than that in the case of representing a column feature by an addition sum of other column features. Consequently, the capacity of the dictionary can be further reduced.

Figure 14:
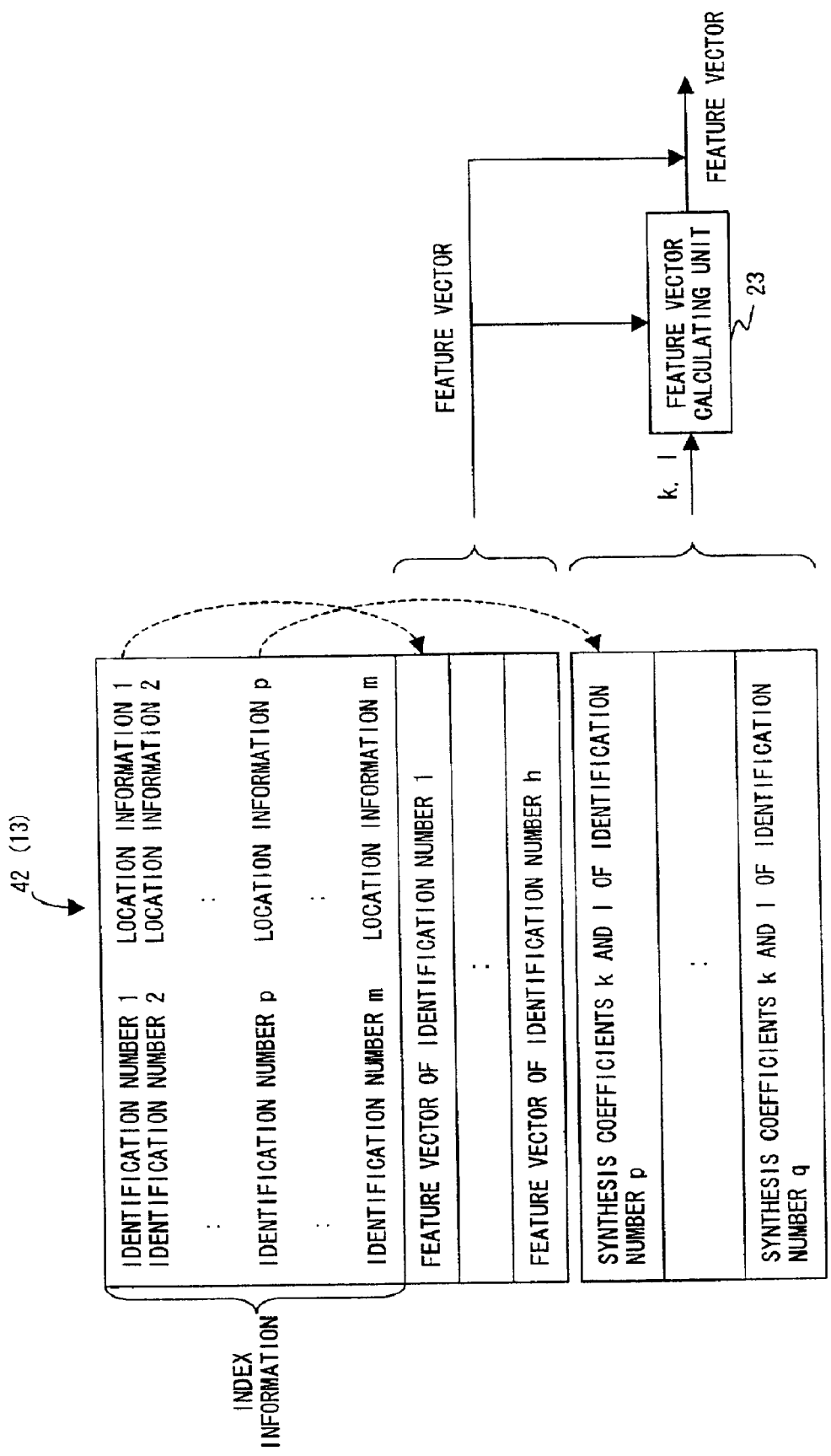
FIG. 14 exemplifies the structure of a feature dictionary generated in the second preferred embodiment.

FIG. 14 exemplifies the structure 42 of the feature dictionary 13 generated in the second preferred embodiment. The feature dictionary 42(13) the capacity of which is reduced holds as index information identification numbers and location information within the dictionary as shown in FIG. 14. The location information indicates the storage locations of m feature vectors or synthesis coefficients k and l, which respectively correspond to the identification numbers. If a column feature is represented by an addition sum of other column features without using a differential feature as described above, the synthesis coefficient l may be set to 0.

To read a feature vector from the feature dictionary, the storage location of the feature vector or the synthesis coefficients k and l is obtained from the location information corresponding to the identification number. If the feature vector is stored at the storage location, it is read unchanged. Or, if the synthesis coefficients k and l are stored at the storage location, a feature vector calculating unit 23 calculates a feature vector with the above provided equation (1) or (2).

Also in this preferred embodiment, an appearance frequency of a character feature, which is required when a word feature is generated, is examined beforehand for a category to be recognized when identification numbers are arranged, in a similar manner as in the first preferred embodiment. That is, the identification numbers are arranged in a descending order of appearance frequencies, so that an access to the index information can be made faster.

(3) Preferred Embodiment 3

For a weighted direction code histogram feature, dimension compression is performed by making feature conversion such as a canonical discriminant analysis, etc. for extracted original features of 7×7×8 dimensions in order to eliminate the redundancy of information included in the features. As a result, the number of feature dimensions drops, for example, from 392 to approximately 100. As described above, features that are converted beforehand with feature conversion such as a principal component analysis, a canonical discriminant analysis, etc. are clustered and coded, thereby reducing the capacity of the dictionary.

Figure 15:
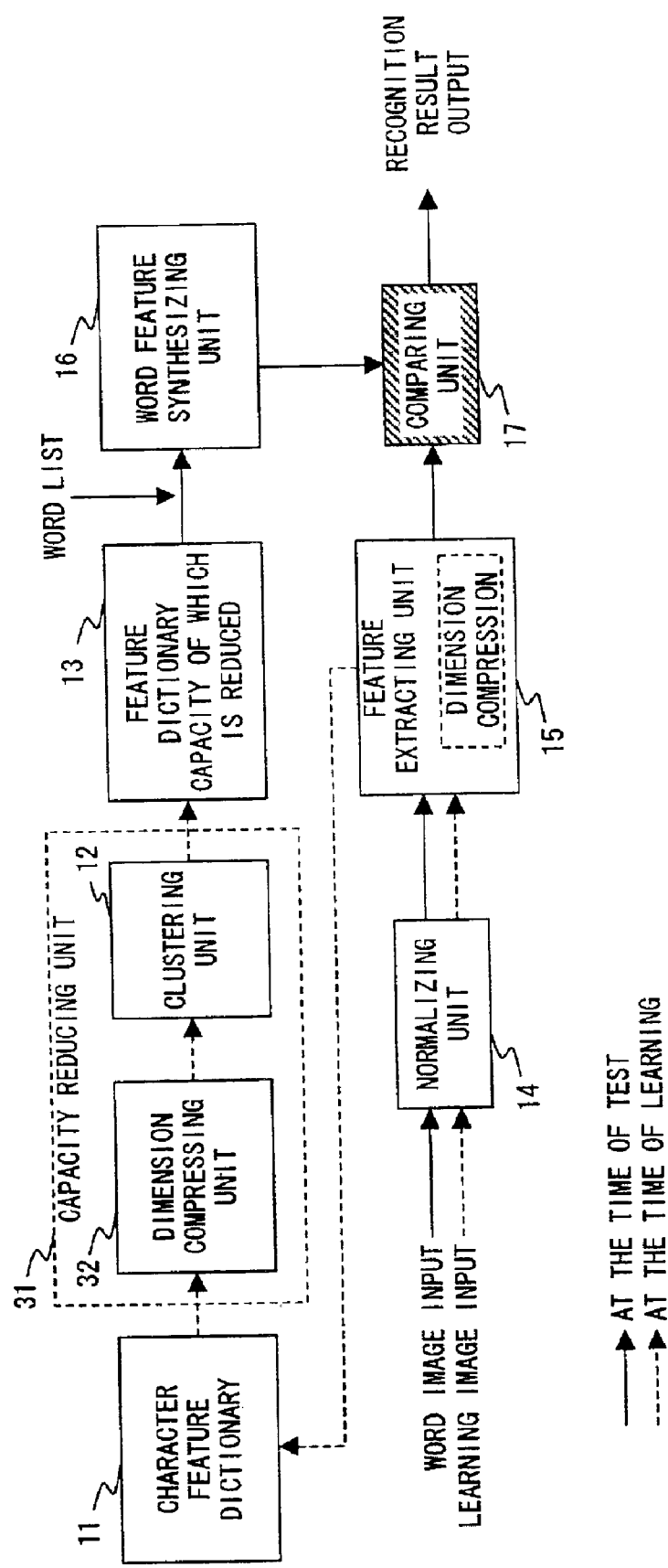
FIG. 15 shows a third preferred embodiment according to the present invention.

FIG. 15 shows the configuration of capabilities of a third preferred embodiment.

In FIG. 15, feature vectors extracted from an input character image are stored in a character feature dictionary 11 at the time of learning as described above.

A capacity reducing unit 31 relating to this preferred embodiment is configured by a dimension compressing unit 32 which performs the above described dimension compression, and the clustering unit 12 stated earlier.

The dimension compressing unit 32 performs dimension compression by making feature conversion such as the canonical discriminant analysis, etc. as described above. If the feature conversion is performed for an original feature, this conversion is performed not for a column vector but for the original feature itself.

Here, assume that an original feature is "f", a converted feature is w, and a feature conversion matrix obtained by the canonical discriminant analysis, etc. is A. The feature conversion matrix A is obtained by the following equation (3).

$$A^* f_i = w_i \quad (3)$$

The clustering unit 12 performs feature conversion as described above, and performs a clustering process for the feature $w_i$ (i=0, ..., M, M: the number of original features) for which the dimension compression is performed, makes m (m≦M) feature vectors representative, and assigns identification numbers 1 to m to the representative vectors.

Column vectors obtained as described above are stored in the feature dictionary 13.

A word recognition process in the third preferred embodiment is performed as follows.

A normalizing unit 14 normalizes an input word, and a feature extracting unit 15 extracts a feature, and performs feature conversion (dimension compression) for the extracted feature vector with the above described equation (3).

In the meantime, a word feature synthesizing unit 16 synthesizes a word feature for a comparison from column features stored in the feature dictionary 13 based on a predetermined word list to be recognized.

Then, a comparing unit 17 makes a comparison between the feature extracted from the input word, for which the feature conversion (dimension compression) is performed, and the synthesized word feature, so that word recognition is performed.

In this preferred embodiment, feature amounts for which dimension compression is performed are clustered, thereby further reducing the capacity of the dictionary.

In the preferred embodiment shown in FIG. 15, a synthesis coefficient may be obtained and stored in the dictionary after a clustering process is performed as explained in the second preferred embodiment. As a result, the capacity of the dictionary can be further reduced.

As described above, the following effects can be obtained according to the present invention.

(1) Character features are clustered and coded in units of column or row features, thereby significantly reducing the capacity of a character feature dictionary, and making the capacity of the dictionary reach a practical level.

Additionally, character features are clustered and coded not in units of one column but in units of a plurality of columns, thereby synthesizing a word feature at high speed.

Furthermore, column or row features are coded not in units of column features but in units of meshes, whereby coding based on more accurate feature approximation is enabled.

(2) A comparison is made with nonlinear elastic matching between synthesized word and input word features whose numbers of dimensions are different, so that a change in a character shape can be absorbed not by a feature vector within the dictionary but by a compared portion. This eliminates the need for absorbing a change in a character shape by registering many feature vectors to a dictionary, which leads to a further reduction in the capacity of the dictionary.

(3) It is examined whether or not there is a combination with which a certain column feature can be represented by an addition sum of other column features, or a combination with which a certain row character can be represented by an addition sum of other row features, after clustering is performed in units of column or row features. If there is a corresponding combination, the identification number of the column or the row feature and a synthesis coefficient are stored in the dictionary, thereby further reducing the capacity of the dictionary.

Additionally, it is examined whether or not there is a combination with which a certain column feature can be represented by a sum of other column features and differential features, or a combination with which a certain row character can be represented by a sum of other row features and differential features. If there is a corresponding combination, the identification number of the column or row feature and synthesis coefficients are stored in the dictionary. As a result, a frequency at which a column or row feature can be represented becomes higher than that in the case where a column or row feature is represented merely by a sum of other column or row features, which leads to a further reduction in the capacity of the dictionary.

(4) Feature conversion is performed for character features beforehand to compress dimensions, and the converted features are coded by performing a clustering process, which eliminates the need for performing feature conversion after a word feature is synthesized. As a result, the entire process of character recognition can be made faster. At the same time, also the capacity of the dictionary can be reduced.

(5) Index information is held for feature vectors within the dictionary, thereby enabling a high-speed access to the dictionary.

Furthermore, column or row features are arranged in a descending order of use frequencies, whereby also an access to the index information can be made at high speed.

FIG. 16 exemplifies the hardware configuration of an information processing device implementing a word recognition device according to any of the preferred embodiments.

The word recognition device according to the preferred embodiments can be implemented by a normal computer system as described above (the present invention is not limited to this implementation, and maybe implemented by a portable information processing device such as a PDA, a handheld PC, etc.).

An information processing device 50 shown in FIG. 16 comprises a CPU 51, a memory 52, an input device 53, an output device 54, an external storage device, a medium driving device 56, a network connecting device 57, etc., which are interconnected by a bus 58. The configuration shown in this figure is merely one example, and the present invention is not limited to this one.

The CPU 51 is a central processing device controlling the whole of the information processing device 50.

The memory 52 is a memory such as a RAM, etc., which temporarily stores a program or data stored in the external storage device 55 (or, portable storage medium 59) at the time of program execution, a data update, or the like. The CPU 51 executes the above described processes with the program/data loaded into the memory 52.

The input device 53 is, for example, a keyboard, a mouse, a scanner for reading a character image, etc., or the like.

The output device 54 is, for example, a display, a printer, or the like.

The external storage device 55 is, for example, a magnetic disk device, an optical disk device, a magneto-optical disk device, or the like, and stores a program/data for implementing the above described capabilities as the word recognition device.

The medium driving device 56 reads a program, data, etc. stored onto a portable storage medium 59. The portable storage medium 59 is, for example, an FD (floppy disk), a CD-ROM, a DVD, a magneto-optical disk, etc.

The network connecting device 57 allows a program, data, etc. to be transmitted/received to/from an external information processing device by making a connection to a network.

Figure 17:
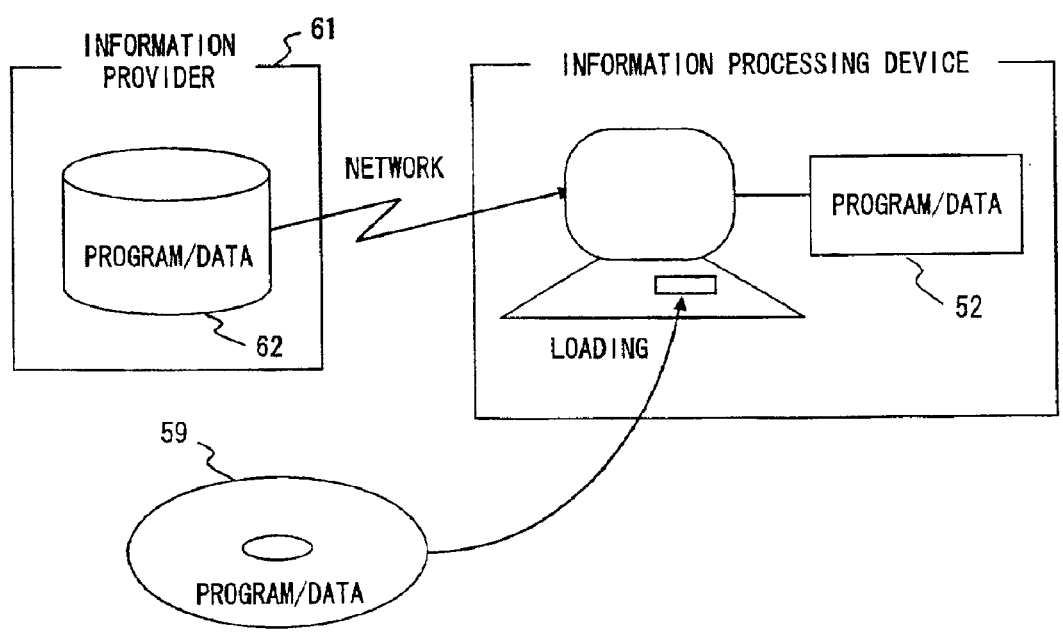
FIG. 17 exemplifies storage media and transmission media carrying a transmission signal.

FIG. 17 exemplifies storage media.

As shown in this figure, the above described program/data stored onto the portable storage medium 59 may be loaded into the information processing device side, stored in the memory 52, and executed. Or, the above described program/data stored in a storage device 62 of a device 61 on an external information provider side may be downloaded via a network (the Internet, etc.) that is connected by the network connecting device 57.

The present invention can be configured by a storage medium (the portable storage medium 59, etc.) itself on which the above described program/data is recorded, a network (transmission medium) itself for transmitting the above described program/data, or a transmission signal itself transmitted via the transmission medium.

What is claimed is:

1. A word recognition device recognizing a word image, comprising:
   a capacity reducing unit reducing a capacity of a character feature dictionary used for synthesizing a word feature;
   a synthesizing unit synthesizing a word feature for a comparison based on a word list to be recognized from column or row features within a feature dictionary a capacity of which is reduced by said capacity reducing unit;
   a feature extracting unit extracting a feature of an input word; and
   a comparing unit making a comparison between the feature of the input word, which is extracted by said feature extracting unit, and a synthesized word feature, and
   wherein said capacity reducing unit comprises:
      a clustering unit clustering similar column or row features for respective features of a column or a row partitioned into meshes, and assigning an identification number to a clustered column or row feature, and
      a holding unit holding the feature to which the identification number is assigned.

2. The word recognition device according to claim 1, wherein
   clustering is performed not in units of one column or row but in units of a plurality of columns or rows at the time of the clustering.

3. The word recognition device according to claim 1, wherein
   a certain column or row feature is described by a coefficient sum of a plurality of other column or row features for clustered column or row features.

4. The word recognition device according to claim 1, wherein
   a certain column or row feature is described by a coefficient sum of other column or row features and differential features for clustered column or row features.

5. The word recognition device according to claim 1, wherein
   features of each mesh within a column or row are respectively coded before column or row features are clustered.

6. The word recognition device according to claim 1, wherein
   said capacity reducing unit performs clustering by using character features, for which dimension compression is performed beforehand with feature conversion, when the capacity of the character feature dictionary is reduced.

7. The word recognition device according to claim 1, wherein:
   an identification number of each column or row feature, and a location within the dictionary are held as index information when the feature dictionary the capacity of which is reduced is configured; and
   the feature dictionary is configured by arranging respective partial features after the index information.

8. The word recognition device according to claim 1, wherein
   a column or row feature whose use frequency is high is examined beforehand when column or row features are arranged, and the column or row features are arranged in a descending order of use frequencies.

9. The word recognition device according to claim 1, wherein
   said capacity reducing unit performs clustering for each feature of a mesh.

10. The word recognition device according to claim 1, wherein
    said comparing unit makes, with nonlinear elastic matching, a comparison between the feature of the input word and the synthesized word feature.

11. A word recognition method, comprising:
    reducing a capacity of a character feature dictionary used for synthesizing a word feature, comprising:
       clustering similar column or row features for respective features of a column or a row partitioned into meshes, and assigning an identification number to a clustered column or row feature; and
       holding the feature to which the identification number is assigned;
    extracting a feature amount of a word of an input image;
    synthesizing a feature amount of each word by synthesizing features of characters structuring each word to be recognized with the use of a character feature dictionary a capacity of which is reduced by collecting similar column or row vectors into one vector that is made representative, when the feature amount of each word to be recognized is obtained based on a word list; and
    making a comparison between the synthesized word feature amount and an extracted word feature amount.

12. A storage medium on which is recorded a program for causing a computer to execute a word recognition process, the process comprising:
    reducing a capacity of a character feature dictionary used for synthesizing a word feature, comprising:
       clustering similar column or row features for respective features of a column or a row partitioned into meshes, and assigning an identification number to a clustered column or row feature; and
       holding the feature to which the identification number is assigned;
    synthesizing a word feature for a comparison from column or row features within the feature dictionary, the capacity of which is reduced, based on a word list to be recognized; and extracting a feature of an input word, and performing word recognition by making a comparison between the extracted feature of the input word and the synthesized word feature.

13. A word recognition device recognizing a word image, comprising:

capacity reducing means for reducing a capacity of a character feature dictionary used for synthesizing a word feature;

synthesizing means for synthesizing a word feature for a comparison based on a word list to be recognized from column or row features within a feature dictionary a capacity of which is reduced by said capacity reducing means;

feature extracting means for extracting a feature of an input word; and comparing means for making a comparison between the feature of the input word, which is extracted by said feature extracting means, and a synthesized word feature, and wherein said capacity reducing means comprises:

clustering means for clustering similar column or row features for respective features of a column or a row partitioned into meshes, and assigning an identification number to a clustered column or row feature, and holding means for holding the feature to which the identification number is assigned.

* * * * *